(No Model.)

F. STICKNEY.
LOCKING DEVICE FOR BOX COVERS.

No. 467,960. Patented Feb. 2, 1892.

Witnesses:

Inventor:
Frank Stickney,
By Banning & Banning & Payson
Att'ys

UNITED STATES PATENT OFFICE.

FRANK STICKNEY, OF ROGERS PARK, ASSIGNOR TO THEODORE M. MOE, OF CHICAGO, ILLINOIS.

LOCKING DEVICE FOR BOX-COVERS.

SPECIFICATION forming part of Letters Patent No. 467,960, dated February 2, 1892.

Application filed April 22, 1891. Serial No. 389,904. (No model.)

*To all whom it may concern:*

Be it known that I, FRANK STICKNEY, a citizen of the United States, residing at Rogers Park, Cook county, Illinois, have invented a certain new and useful Improvement in Boxes, &c., of which the following is a specification.

The object of my invention is to make a box provided with a lock which shall be hidden or concealed, so as to render it difficult for any one not familiar with the device to open the box; and it consists in the features and details of construction hereinafter described and claimed.

Figure 1:
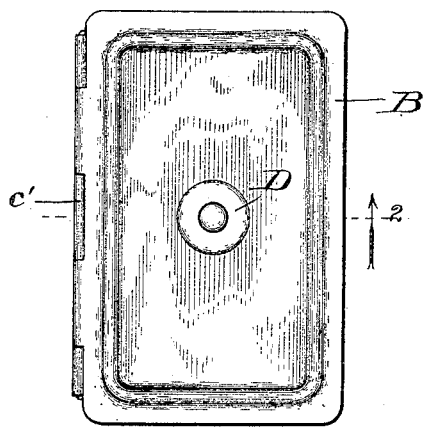
Figure 2:
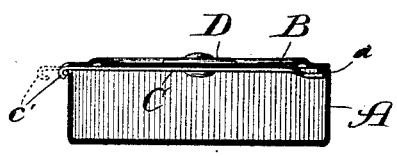
Figure 3:
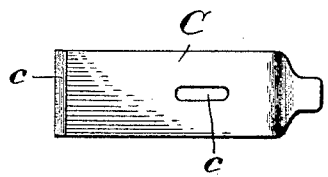

In the drawings, Figure 1 is a plan view of a match-box provided with my concealed lock; Fig. 2, a section on line 2 of Fig. 1 looking in the direction of the arrow, and Fig. 3 a plan view of the sliding bolt or lock removed from the box.

While I have shown my invention in the drawings as applied to a match-box, it will be understood that I do this merely as an illustration of one place in which it may be used; but I contemplate applying it to tobacco-boxes, stamp-boxes, or any other box or device in connection with which it is capable of being used, and I do not therefore intend to limit myself to its use in connection with a match-box solely.

The box A is made, except as hereinafter described, of any suitable material and dimensions in any desired manner, and is provided with a cover B, hinged thereto, preferably along one side, as shown. To the inside of this cover, at any desired point, I attach in any suitable manner, as by means of a slot $c$ and rivet D, a sliding plate C, the form of which is more particularly shown in the last two figures of the drawings. One end of this plate engages, as shown, with a lug or projection $a$ on the side of the box, beneath which the end of the plate passes, thereby preventing the opening of the box. The other end of the plate is rounded, as shown at $c'$, into a shape and size to exactly resemble one of the parts or divisions of the hinge, so that when the plate is pushed in it will be impossible for a casual observer to distinguish between the parts which actually compose the hinge and the rounded end of this sliding plate.

When it is desired to open the box, one familiar with the secret can do so by pulling out the plate by means of its rounded end $c'$, disengaging the other end from the lug $a$, after which the cover will readily open. To lock it, the cover is closed and the plate slid in again. The plate should preferably be held somewhat firmly in contact with the cover of the box to prevent its sliding out to unlock the box, unless positive force be applied thereto, thereby avoiding any possible opening of the box when it is shaken. The rivet D is preferably finished on the outside of the box, so as to resemble a push-button, in order to deceive any one endeavoring to open the box, thereby increasing the difficulty of detecting the manner of opening or unlocking. While I have shown this plate as forming the middle section of the hinge, it is evident that it may form any other section thereof, or that, if desired, two sections of the hinge may be made to slide, affording two locks. Furthermore, the rivet D may be covered by pasting leather or other material over the top of the box. It will of course be understood that the form and dimensions of the various parts may be altered and equivalent members substituted, as may be necessary or desirable.

I claim—

1. In combination, a box provided with a hinged cover, a locking device contained within the box and independently movable with respect to the box and cover, the said locking device having an external operating part $c'$, constructed and adapted to be arranged to resemble a section of the hinge when the box is locked, and a part $a$ to be engaged by the locking device to lock the box, substantially as set forth.

2. In combination, a box having a hinged cover, a locking device secured to the cover, the said locking device provided with an external operating part $c'$, constructed and adapted to be arranged to resemble a section of the hinge when the box is locked, and a projection or part $a$ on the box to be engaged by the locking device, substantially as described.

3. The combination of a box having a lug and a hinged cover, a slotted locking-plate attached to such cover, one end of such plate engaging with the lug, and the other end of such plate being curved to represent, when the box is locked, one section of the hinge, whereby the cover is attached to the box, substantially as described.

FRANK STICKNEY.

Witnesses:
GEORGE S. PAYSON,
SAMUEL E. HIBBEN.